G. A. ZEISER.
RULING MACHINE.
APPLICATION FILED NOV. 23, 1914.

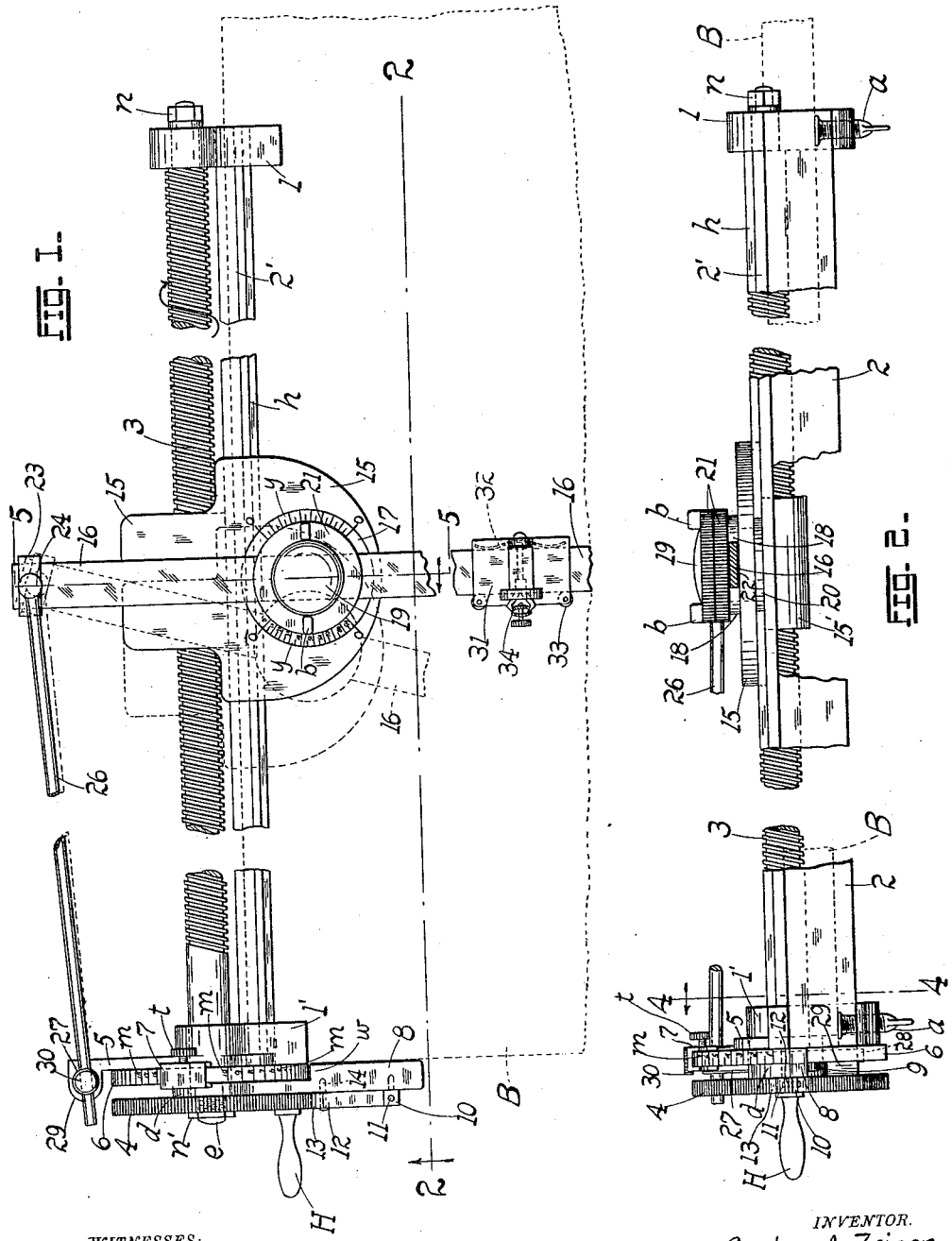

1,138,716.

Patented May 11, 1915.
2 SHEETS—SHEET 2.

WITNESSES:
Harry A. Beimes
Else M. Siegel

INVENTOR.
Gustav A. Zeiser.
BY
Emil Staren
ATTORNEY.

UNITED STATES PATENT OFFICE.

GUSTAV A. ZEISER, OF ST. LOUIS, MISSOURI.

RULING-MACHINE.

1,138,716.　　　　Specification of Letters Patent.　　Patented May 11, 1915.

Application filed November 23, 1914. Serial No. 873,534.

*To all whom it may concern:*

Be it known that I, GUSTAV A. ZEISER, a citizen of the United States, residing at St. Louis, State of Missouri, have invented certain new and useful Improvements in Ruling-Machines, of which the following is a full, clear, and exact description, reference being had to the accompanying drawings, forming a part thereof.

My invention has relation to improvements in ruling machines; and it consists in the novel features of construction more fully set forth in the specification and pointed out in the claims.

Figure 3:
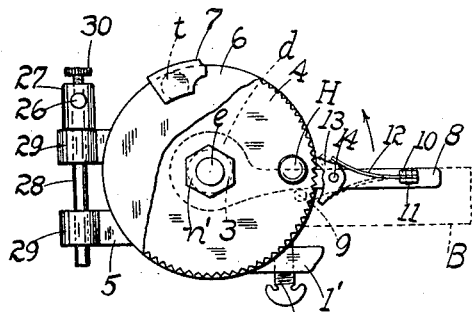
Figure 4:
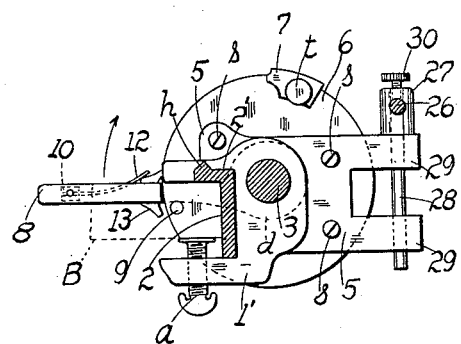
Figure 5:
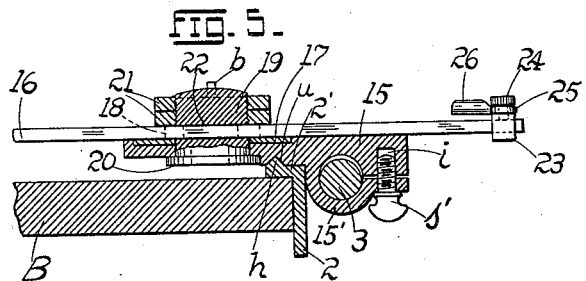
Figure 6:
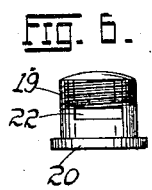
Figure 7:
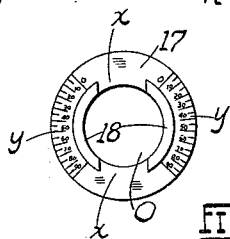
Figure 8:
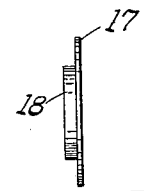
Figure 9:
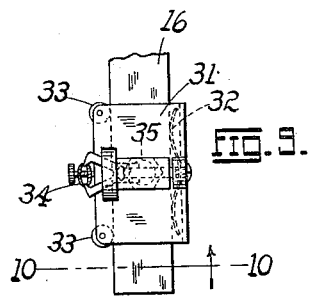
Figure 10:
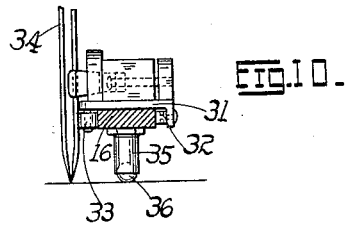

In the drawings, Figure 1 is a top plan of my machine, showing parts broken; Fig. 2 is a vertical section through the rule member on the line 2—2 of Fig. 1, the balance showing an inside longitudinal elevation of the appliance; Fig. 3 is an end view of the appliance looking toward the right in Fig. 1 with parts broken away; Fig. 4 is a vertical cross-section on the line 4—4 of Fig. 2; Fig. 5 is a vertical section through the rule member and traveling head in a plane across the feed-screw on the line 5—5 of Fig. 1; Fig. 6 is a detached elevational view of the guide-nut for the rule or straight-edge bar; Fig. 7 is a plan view of the flanged protractor disk traversed by the rule member; Fig. 8 is an edge view of Fig. 7; Fig. 9 is a plan of the bow-pen carriage; and Fig. 10 is a cross-section on the line 10—10 of Fig. 9.

The present invention is specially directed to improvements in mathematical ruling appliances designed for ruling shade lines on perspective, isometric and other drawings where such lines converge toward a common focus or vanishing point, the appliance being likewise adapted for ruling parallel lines.

The object of the invention is to provide an appliance or machine which will secure uniformity in the spacing of the lines; one which can be readily manipulated; quickly applied to the drawing board or surface supporting the work; one which is light, stiff, and durable, and one possessing further and other advantages better apparent from a detailed description of the invention, which is as follows:

Referring to the drawings, B represents a drawing board to which my machine is applied, the same being secured at the upper left-hand corner of the board. The machine comprises a pair of ordinary clamp-hangers 1, 1', the jaws of which span the board to which they are secured by screws $a$, $a$, passed through the lower jaw, as well understood in the art. The length of the machine is determined by the distance between the members 1, 1', which are connected by a plate or bar 2 secured to the clamp-hangers at the bases of the jaws thereof, the bar being formed with a top flange 2' projecting toward the free ends of the clamp-jaws, the upper surface of the flange being provided with a marginal ridge or rail $h$. Rotatably mounted between the lobes or body portions of the members 1, 1', is a feed-screw 3 provided with lock-nuts $n$, $n'$, at opposite ends. The nut $n'$ maintains in proper position on the adjacent reduced screw-threaded end $e$ of the feed-screw 3, a toothed disk 4 screwed over the portion $e$ and shouldered to the main body of the feed-screw, the disk being thus rigid with the feed-screw and rotating conjointly therewith.

Formed integrally with one of the clamp-hangers, to wit, the member 1', is a forked bracket 5, to the outer face of which is secured by screws $s$ or otherwise, a plain disk 6 provided with suitable peripheral graduations $m$ as shown (Figs. 1, 2,) with which graduations there coöperates a sliding stop 7 spanning the faces of the disk and adapted to be secured opposite any particular graduation by a set-screw $t$ engaging one of the faces of the disk. It will be seen that the toothed disk 4 and graduated disk 6 are spaced a suitable distance apart, the plain cylindrical or unthreaded portion of the feed-screw 3 between the disks being loosely encompassed by the terminal lobe or loop $d$ of a ratchet lever or arm 8 swinging freely between the disks and provided with an offset $w$ adjacent to the graduated periphery of the disk 6, whereby it may swing freely close to said periphery and at the proper moment engage, and be arrested by, the stop 7. When in its lowest position the lever 8 rests on a stop pin 9 carried by the disk 6 and projecting into the space between the disks 4, 6. The lever 8 is provided along its outer face with a pair of lugs (or a split head) 10, between which is secured by means of a pin 11 passed through the lugs, one end of a flexed spring 12 whose free end engages the basal portion of one of two members of a double pawl 13 pivotally mounted about a pin 14 on the lever 8, one or the other of the pawls being adapted to engage the teeth of the disk 4, depending in which direction the pawl is rocked, it being understood that the spring 12 will yield sufficiently to be drawn past the pawl 13 in either direction to engage one side or the other of the pawl, or the spring may be detached from the pin 11 and reset to engage the opposite side of the pawl, as desired. H represents a handle carried by the ratchet disk 4.

Mounted to reciprocate along the feed-screw, is a head or carriage 15, preferably split as shown in Fig. 5, the portion 15′ below the split being more or less resilient and yielding, and capable of being drawn to exert any desired grip on the feed-screw, by means of the tightening screw $s'$ operating in a socket $i$ in the main body portion of the carriage. The latter of course operates as an ordinary nut, the same being advanced along the screw with any rotation of said screw. The form of the carriage or head 15 is preferably as shown (Figs. 1, 5), the same extending in both directions from the axis of the screw, the said carriage being provided with a groove $u$ for receiving the rail or ridge $h$ of the bar 2, along which it is guided, and by which it is maintained rigid and steady. The upper face of the carriage affords an extended platform or surface of support for the rule member or straight edge 16, which rule is freely oscillatable over the said surface, the sweep of the rule being over any predetermined angle within suitable limits. The rule is pivotally connected at an intermediate point of its length to the head 15 by the following means: Deposited in a suitable depression in the front upper portion of the platform, and flush with the upper surface thereof, is an annular protractor disk 17, the same being provided with diametrically opposite arcuate flanges or ribs 18, 18, between whose adjacent ends are left diametrically opposite passage-ways $x, x$, for the passage of the rule 16, the ends of the flanges 18 engaging the sides of the rule. The protractor graduations $y$ are disposed on the upper face of the disk around the flanges 18 (Fig. 7). Through the opening 0 of the protractor disk 17 and through an opening formed in the head 15 registering with the opening 0, is passed a screw-bolt or stud 19, one end of which (the lower end) is provided with a limiting flange 20 engaging the bottom of the head 15, the screw-threaded portion of the bolt projecting above the rule 16 and free to receive a pair of lock-nuts 21, 21, by which the bolt or stud is secured in place and by which the rule is clamped to the bolt. The bolt is provided with a transverse passage-way or slot 22 as shown, for the accommodation of the rule 16, said slot being disposed in a plane above the upper surface of the head 15, and between the flanges 18, 18, of the protractor disk 17 (Fig. 5). It may be stated in passing that the outer lock-nut 21 is preferably provided with projections or lugs $b$ for the application of a wrench or equivalent tool if necessary. Set-screwed to the rear terminal of the rule 16 (that is to say to the terminal of the short lever arm of the rule) is a strap or block 23, the stem of the screw 24 being loosely enveloped by the terminal eye or loop 25 of a connecting rod or link 26 whose opposite end passes through the head 27 of a stem 28 freely rotatable in the bearings or enlargements 29 formed along the outer faces of the arms or forks of the fork-bracket 5 secured to or formed with the hanger 1′. The head 27 rests on the upper of said bearings 29, and the link 26 is secured to said head by a set-screw 30.

The end of the rule 16 nearest the draftsman may be provided with a sliding head 31 held in engagement with the rule by a flexed spring 32 and rollers 33, said head carrying a bow-pen 34 well understood in the art. At a convenient point (near the free end of the long arm) the rule is provided with a leg 35 with a roller or caster 36 for riding on the drawing board B.

The operation will be readily understood from the foregoing description, and may be briefly stated to be as follows: The appliance being clamped to the board B (table or other surface on which a drawing is being made), and assuming that the position of the head 15 is such as to bring the rule 16 at right angles to the axis of the feed-screw 3 as shown in Fig. 1, should the draftsman desire to rule a series of lines pointing to a common focus or vanishing point, he seizes the lever 8 swinging it in the direction indicated by arrows in Figs. 3 and 4, the pawl 13 carried by said lever imparting rotation to the disk 4 through an arc depending on the position of the stop 7 which arrests the lever 8. The disk 4 in turn imparts rotation to the screw 3, the latter advancing the head 15 along the screw. With each advance of the head 15 the rule 16 will be oscillated from its original position through an arc depending on the degree of advance of the head 15, thus bringing its ruling edge in proper position for the next line to be marked on the paper on the board B. With each release of the lever 8 the same drops to its original position against the peg 9, in readiness to be swung through its next stroke or until arrested by the stop 7, when another rotation will be imparted to the disk 4 and its screw 3, and another advance imparted to the head 15 with a corresponding oscillation to the rule 16. In this way a series of converging lines may be drawn on the drawing board with trueness as to direction. Should it be desirable to advance the head 15 in the opposite direction to enable the draftsman to rule along the opposite edge of the rule 16, the pawl 13 and spring 12 are reversed (see dotted position in Fig. 3), in which event the draftsman starts the rotation with the lever 8 against the stop 7 and swings the lever down until arrested by the peg 9. This is obvious from the drawings. By uncoupling the link 26 and screwing the nuts 21 so as to clamp the rule 16 tightly to the face of the head 15, rotation of the screw 3 will then cause the rule to be moved parallel to itself in which event a series of parallel (instead of converging) lines may be drawn. When the head 15 reaches either end of the screw 3, it may be quickly restored to any desired position on the screw, by disengaging the pawl 13 from the disk 4, then seizing the handle H, and freely rotating the disk in proper direction the requisite number of revolutions to bring the head where desired. Thereupon the pawl is reset to engage the disk 4, and the instrument is ready for further service either for converging lines (by attaching the link 26) or for parallel lines (by allowing the link to remain detached). With each rotation (or partial rotation) of the screw 3, the head (or nut) 15 is advanced along the screw in a direction depending on the direction of rotation of the screw, and naturally, in such advance or motion of translation of the head, the rule 16 will be oscillated about the axis of the bolt 19. This oscillation is permitted by virtue of the link connection 26 between the short lever arm of the rule, and the rotatable stem 28 (see dotted position of the parts Fig. 1), the loop 25 according the link 26 perfect freedom of movement at one end, while the stem 28 accords it perfect freedom of movement at the opposite end. With every periodic rotation of the disk 4 (which is coupled to the screw 3) there will be a corresponding rotation of the screw 3 and hence an axial advance of the head 15. These slight advances of the head impart slight and progressive inclinations to the axis of the rule 16 relative to its original line of perpendicularity to the axis of the screw, and with each inclination thus imparted to the rule, the draftsman by running his pen or pencil along the edge of the rule will necessarily draw a series of lines converging substantially toward a common vanishing point. The degree of these successive (and final) inclinations is measured by reading the graduations y on the protractor disk 17 between the zero (0) marks on the face of the head 15 as fully shown in Fig. 1. In the oscillations of the rule 16, it is of course obvious that rotation is imparted to the stud 19 about its axis, and to the disk 17 whose flanges 18, 18, engage the rule from opposite sides. By varying the position of the stop 7 along the disk 5, we may vary the throw imparted to the disk 4, and hence vary the rotation to the screw-feed 3 and the longitudinal advance of the head 15. In this way we can oscillate the rule 16 as much or as little as we please and draw the lines as close or as far apart as may be desired. The rule being raised off the board (Figs. 2, 10,) the draftsman can always clearly see his work, whether the rule is caused to oscillate in one direction or the other. The protractor disk 17 serves as a check on the lever 8; and if the stop 7 should for any reason slip or become shifted, the graduations on the disk 17 would at once disclose any discrepancy in the arc of oscillation of the rule 16.

The device may be changed in details without departing from the nature or spirit of the invention.

Having described my invention, what I claim is:

1. In a ruling appliance, a suitable feed-screw, a head traveling thereon, a rule pivotally mounted on said head at a point between the ends of the rule, a fixed support a link loosely coupled to one arm of the rule and to said fixed support, means for supporting the feed-screw and means for imparting rotations to the feed-screw.

2. In a ruling appliance, a suitable feed-screw, a head traveling along the screw, a rule pivotally mounted on the head at a point between the ends of the rule, a fixed support, a link loosely coupled to one arm of the rule and to said fixed support, means for supporting the feed-screw, means for imparting rotations to the screw, and means for limiting the degree of any rotation thus imparted.

3. In a ruling appliance, a suitable feed-screw, a rail mounted adjacent thereto, a head traveling along the screw and bearing on said rail, a rule mounted pivotally on the head and swinging in a plane parallel to the axis of the screw, a fixed support, a link loosely coupled to the rule on one side of the pivotal axis thereof, and to said fixed support respectively, means for supporting the feed-screw, means for imparting rotation to the screw, and means for limiting the angle or arc of any given rotation and hence the distance of advance of the head along the screw and the degree of oscillation of the rule.

4. In a ruling appliance, a pair of clamp-hangers, a rail member connecting the same, a feed screw mounted between the hangers adjacent the rail member, a toothed disk secured to one end of the screw, a lever mounted to freely oscillate about the screw adjacent the toothed disk, a pawl on the lever engaging the toothed edge of the disk, a stationary disk secured to the hanger adjacent the lever, said disk being graduated peripherally, a stop mounted adjustably on the graduated disk for arresting the pawl-lever, a rest for the lever to support the same in its released position, a head traversing the screw, a rule mounted on the head at a point intermediate its length and oscillatable in a plane parallel to the axis of the screw, a fixed support on the hanger carrying the graduated disk and a link having its ends loosely coupled to one arm of the rule and to said fixed support respectively.

5. In a ruling appliance of the character described, a feed-screw, a head traversing the same axially and extending in opposite directions across the axis of the screw, an annular protractor disk provided with diametrically disposed arcuate ribs on opposite sides of the opening thereof, said disk being flush with the surface of the head and the ribs extending above said surface and having their adjacent ends spaced apart, a stud projecting through the head and the opening of the disk and provided with a transverse slot above the plane of the surface of the head, a rule passed through said slot and the passage-ways between the adjacent ends of the ribs aforesaid, and lock nuts on the stud for holding the rule against longitudinal displacement.

6. In a ruling appliance of the character described, a protractor disk having a central opening bounded by diametrically disposed arcuate flanges or ribs, and having radial graduations on the face between the ribs and the periphery of the disk, for the purpose set forth.

7. In a ruling appliance, a feed-screw, a traveling head or platform mounted thereon, a rule pivoted to the platform and oscillating in a plane parallel to the axis of the screw, said rule extending across the screw on opposite sides of the axis thereof, bearings for the screw maintained a fixed distance apart, a rotatable stem mounted adjacent to one of the bearings, a member on the rule on one side of the pivotal axis thereof, set-screwed to the rule, a link terminating at one end in a loop loosely embracing the stem of the set-screw, the opposite end of the link being coupled to the rotatable stem aforesaid, and means for imparting periodic rotations to the screw and corresponding advances to the head.

8. In a ruling appliance of the character described, a feed-screw, a toothed disk secured to the same, a lever freely swinging about the screw, and a double pawl member pivotally mounted on the lever for actuating the disk in either direction.

In testimony whereof I affix my signature, in presence of two witnesses.

GUSTAV A. ZEISER.

Witnesses:
 EMIL STAREK,
 ELSE M. SIEGEL.

Copies of this patent may be obtained for five cents each, by addressing the "Commissioner of Patents, Washington, D. C."